United States Patent

[11] 3,620,220

[72] Inventor William P. Murphy, Jr.
 Miami, Fla.
[21] Appl. No. 862,657
[22] Filed Oct. 1, 1969
[45] Patented Nov. 16, 1971
[73] Assignee Cordis Corporation
 Miami, Fla.

[54] CARDIAC PACER WITH REDUNDANT POWER SUPPLY
5 Claims, 1 Drawing Fig.

[52] U.S. Cl. .................................................. 128/419 P,
 307/66, 307/86
[51] Int. Cl. ................................................... A61n 1/34
[50] Field of Search ....................................... 128/419 P;
 307/48, 64–66, 71, 80, 85, 86, 87; 320/1

[56] References Cited
UNITED STATES PATENTS
3,493,777 2/1970 Richards ..................... 307/80

3,518,986 7/1970 Woods et al. ............... 307/86
FOREIGN PATENTS
225,033 12/1958 Australia ....................... 307/64
1,082,752 9/1967 Great Britain ................ 128/419 P Primary Examiner—William E. Kamm
Attorney—Kenway, Jenney & Hildreth ABSTRACT: The cardiac pacer disclosed herein employs a redundant power supply in which a pair of batteries are connected to pulse-generating circuitry through the collector-emitter circuits of respective transistors. A forward-biasing current is applied to the transistor base terminals, which are connected together, so that the batteries energize the pulse-generating circuitry jointly when both are in satisfactory condition and, upon the occurrence of a failure in one of the batteries, the failing battery is effectively isolated from the pacer circuitry.

PATENTED NOV 16 1971 3,620,220
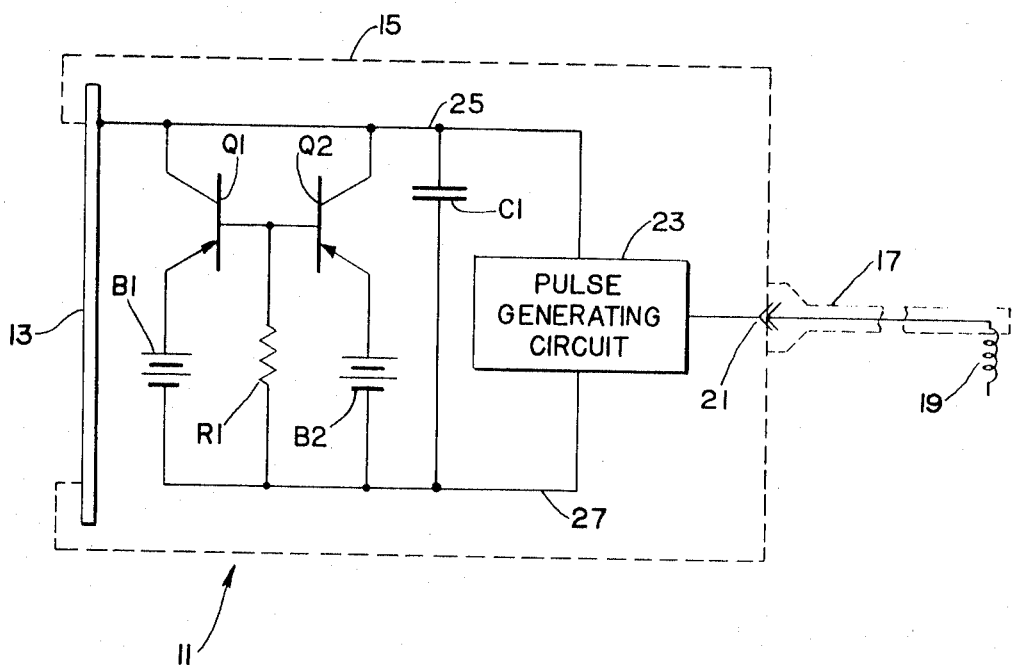
INVENTOR
WILLIAM P. MURPHY, JR.
BY
Kenway, Jenney + Hildreth.
ATTORNEYS

CARDIAC PACER WITH REDUNDANT POWER SUPPLY

BACKGROUND OF THE INVENTION

This invention relates to cardiac pacers and more particularly to such a pacer employing a redundant power source for improved reliability.

While the batteries used in implantable cardiac pacers are constructed and/or selected with extreme care so as to insure long life and maximum reliability, there still exists an appreciable danger from unpredictable premature failures. Merely increasing battery size to extend expected life is not a satisfactory solution since, as intimated previously, there is a statistically significant chance that any given cell will fail after an unpredictable or random period of operation.

In accordance with one aspect of the present invention, reliability is increased by employing redundant power sources. As is understood by those skilled in the art, reliability can in general be greatly increased by employing redundant elements, since the chance of system failure varies inversely as an exponential function of the number of individual elements which must fail to produce a system failure.

In another aspect of this invention, redundant power source protection is provided without wasting battery capacity and without incurring substantial or excessive voltage or current losses.

Among the several objects of the present invention may be noted the provision of an implantable cardiac pacer having improved reliability; the provision of such a pacer which efficiently utilizes battery capacity; the provision of such a pacer which does not waste battery power; and the provision of such a pacer which is relatively simple and inexpensive.

Other objects and features will be in part apparent and in part pointed out hereinafter.

SUMMARY OF THE INVENTION

Briefly, an implantable cardiac pacer constructed according to the present invention employs first and second batteries for energizing a pulse-generating circuit. The pulse-generating circuit is connected across the first battery through the collector-emitter circuit of a first transistor and across the second battery through the collector-emitter circuit of a second transistor, the collectors of the transistors being commonly connected to one side of the pulse-generating circuit. A forward-biasing current is applied to the base terminals of the two transistors in common. Accordingly, the pacer is jointly energized by the two batteries as long as both are in satisfactory condition and, upon a reduction in voltage of one of the batteries, the load is assumed by the battery having the higher voltage.

BRIEF DESCRIPTION OF THE DRAWING

The single FIGURE is a partially schematic illustration of an implantable cardiac pacer employing redundant power supply means in accordance with the present invention.

DESCRIPTION OF THE PREFERRED EMBODIMENT

Referring now to the drawing, a cardiac pacer according to this invention is indicated generally at 11. As illustrated, the pacer employs an electrode system such as that disclosed in U.S. Pat. No. 3,253,595 issued May 31, 1966 to William P. Murphy, Jr. et al. A reference or nominal ground potential with respect to a patient's body is established by means of an electrode 13 which is of substantial area and which comprises a portion of the case which encloses the pacer circuitry and batteries. The remainder of the case may conveniently be constructed by casting or potting the electronic components in an insulating resin material as indicated at 15.

In conventional practice, the case containing the pacer circuitry is preferably placed in a surgically formed subcutaneous pocket at a convenient location spaced away for the patient's heart. Thus, access to the pacer circuitry and the batteries may be had relatively easily, that is, without thoracic surgery.

The pacer circuitry is then connected, through a flexible lead as indicated at 17, to one or more electrodes 19 which are adapted to be sutured to the cardiac tissue itself. The lead and the pacer circuitry may be joined by a conventional sealable connector as indicated at 21.

A pulse-generating circuit suitable for cardiac stimulation is indicated at 23. As the present invention does not relate to the particular type of stimulation which is to be applied, the pulse-generating circuit is not illustrated in detail. However, it should be understood that various types of cardiac pacing circuit known in the art may be employed, e.g. fixed-rate, synchronous, or standby operation may be provided. Pulse-generating circuit 23 is adapted to be energized through a positive supply lead 25 and a negative supply lead 27. The positive supply lead 25 is taken as local ground and is therefore connected to the ground plate electrode 13. A capacitor C1 connected across the pulse-generating circuit filters the current load so that the current drain is at a relatively steady or averaged level despite the typically pulsating nature of the output waveform.

A pair of batteries B1 and B2 are provided for energizing the pulse-generating circuit 23. The negative terminals of the batteries are connected in common to the negative supply lead 27 while each positive battery terminal is connected to the emitter of a respective PNP transistor Q1 or Q2. The collectors of transistors Q1 and Q2 are connected in common to the positive supply lead 25. Thus, the pulse-generating circuit 23 is connected across each of the batteries through the collector-emitter circuit of a respective one of the transistors. The base terminals of the two transistors are connected together and a forward-biasing current is applied to the base terminals in common through a resistor R1 which is connected to the negative supply lead 27. Thus, assuming that the transistors are reasonably matched and that the batteries B1 and B2 provide equal voltages, both transistors will be turned on. The value of resistor R1 is selected so that the forward-biasing current is sufficient to drive either or both of the transistors to saturation when conducting the current drain of the pulse-generating circuit 23.

While PNP transistors have been shown by way of illustration, it will be understood by those skilled in the art that transistors of complementary conductivity type, i.e. NPN transistors, may also be used providing corresponding changes are made in the polarity or orientation of other elements of the circuit.

The operation of this circuit is substantially as follows. As long as both batteries B1 and B2 are in satisfactory condition, the pulse-generating circuit is energized by the two batteries jointly, the drain on the two batteries being substantially equal. Thus, if there is no sudden, unpredictable or random failure in either of the batteries, the total power available will be efficiently utilized and maximum battery life will be obtained. On the other hand, if either of the batteries should fail, e.g. in an unpredictable failure mode as described previously, the resultant drop in voltage across that battery will cause the base-emitter junction of the respective transistor to be reverse biased so that the transistor is turned off. In other words, the transistors Q1 and Q2 operate as semiconductor current-switching devices and the failing battery is effectively isolated from the pulse-generating circuit by the essentially open circuit presented by the collector-emitter path of the turned-off transistor. While the failure of one of the batteries will of course shorten the maximum operating period which can be obtained, an extremely early or unpredictable complete failure is avoided. Further, it is usual practice to provide battery capacity substantially in excess of that required by the expected interval between battery replacements. Accordingly, it can typically be expected that even one of the two batteries B1 and B2 will be adequate to power the pulse-generating circuit 23 for the expected interval between replacements.

While this redundant power supply circuit provides protection from unpredictable battery failures as described above, its use does not incur a substantial power loss since the voltage drop across the collector-emitter circuits of the transistors Q1 and Q2 is quite small. The low voltage drop allows efficient operation even though relatively low batteries are used. For example, typical pacer circuits are energized at about 2.8 volts, this being the voltage obtainable from a pair of mercury cells connected in series. Assuming a pulse-generating circuit 23 which requires an average current input of 30 microamps, a collector-emitter voltage drop of as low as 0.10 volt may be obtained in the circuit illustrated. Thus, only about 4 percent of the available power is dissipated in the collector circuits of the transistors.

While some power loss occurs in the bias resistor R1, this loss also is relatively small. For example, if the transistors Q1 and Q2 have a current gain of 30 (an easily obtainable figure), the bias current required would be only about 1 microamp to sustain a 30-microamp drain by the pulse-generating circuit 23, as postulated previously. This power loss would thus be about 3 percent of the total consumption, the total loss being about 7 percent. In view of this relatively small power loss, the use of the collector-emitter circuits of transistors can thus be seen to be greatly preferable to using diodes in an analogous switching arrangement, e.g. a diode OR gate. The typical voltage drop across a forward-biased diode is in the order of 0.5 volt. As will be understood, such a voltage drop would represent a substantial power loss in a circuit with a relatively low total supply voltage, e.g. a loss of about 18 percent with a total supply potential of 2.8 volts as is preferred in pacer applications.

In view of the foregoing, it may be seen that several objects of the present invention are achieved and other advantageous results have been attained.

As various changes could be made in the above construction without departing from the scope of the invention, it should be understood that all matter contained in the above description or shown in the accompanying drawings shall be interpreted as illustrative and not in a limiting sense.

What is claimed is:

1. An implantable cardiac pacer, said pacer comprising:
a pulse-generating circuit operable when energized to provide cardiac-stimulating electrical pulses to electrodes attached to a patient's heart;
first and second batteries;
first and second transistors;
circuit means for connecting said pulse-generating circuit across said first battery through the collector-emitter circuit of said first transistor and across said second battery through the collector-emitter circuit of said second transistor, the collectors of said transistors being commonly connected to one side of said pulse-generating circuit; and
means for applying a forward-biasing current to the base terminals of said transistors in common whereby said pulse-generating circuit is jointly energized by said batteries as long as both batteries are in satisfactory condition and, upon a reduction in voltage in one of said batteries, the load is transferred to the other battery.

2. A pacer as set forth in claim 1 wherein each of said batteries comprises a pair of mercury cells.

3. A pacer as set forth in claim 1 wherein said batteries each provide current at a potential of about 2.8 volts.

4. A pacer as set forth in claim 1 wherein said forward biasing current is related to the current drain of said pulse-generating circuit by a factor generally equal to the minimum gain of said transistors.

5. An implantable cardiac pacer, said pacer comprising:
a pulse-generating circuit;
electrode means for coupling pulses generated by said circuit to the heart of a patient;
first and second transistors, the collectors of said transistors being commonly connected to one side of said pulse-generating circuit;
first and second batteries, one terminal of each battery being connected to the emitter of a respective one of said transistors, the other terminals of said batteries being connected in common to the other side of said pulse-generating circuit; and
a resistor connecting the base terminals of said transistors in common to the aforesaid other terminals of said batteries thereby to forward bias at least one of said transistors whereby said pulse-generating circuit is jointly energized by said batteries as long as both provide substantially equal voltages and, upon a reduction in voltage in one of said batteries, the load is transferred to the other battery.